United States Patent
Obidniak

[15] 3,675,775
[45] July 11, 1972

[54] WATER CONDITIONER

[72] Inventor: Louis Obidniak, 3115 de Ramesay Street, Duvernay, Quebec, Canada

[22] Filed: Dec. 5, 1969

[21] Appl. No.: 882,685

[52] U.S. Cl...............................................210/138, 210/333
[51] Int. Cl..................................B01d 35/12, B01d 29/38
[58] Field of Search................210/247, 437, 411, 333, 253, 210/138, 139, 140, 340, 341

[56] References Cited

UNITED STATES PATENTS

| | | | |
|---|---|---|---|
| 3,421,835 | 1/1969 | McCarty | 210/333 X |
| 2,954,872 | 10/1960 | Liddell | 210/411 X |
| 2,454,124 | 11/1948 | Birsch et al. | 210/253 |

FOREIGN PATENTS OR APPLICATIONS

| | | | |
|---|---|---|---|
| 157,647 | 12/1932 | Switzerland | 210/440 |
| 11,700 | 0/1897 | Great Britain | 210/333 |

Primary Examiner—Frank A. Spear, Jr.
Attorney—Fetherstonhaugh and Co.

[57] ABSTRACT

The filtration plant consists of a series of filter units, each comprising a filter bowl containing a tubular filter element. The filter bowl is connected to a water inlet header while the interior of the filter element is connected to a clean water outlet header by way of valve connections. The filter bowl is also valve connected to a drain to permit backwashing. A perforated tube mounted in the center of the filter element which serves to collect clean water during filtering and to provide an even distribution of backwash water on the filter element during backwashing.

5 Claims, 8 Drawing Figures

INVENTOR
Louis OBIDNIAK

Fetherstonhaugh & Co.
PATENT AGENTS

WATER CONDITIONER

BACKGROUND OF THE INVENTION

1. Field of the Invention

This invention relates to a filtration plant, particularly a multiple unit plant for filtering water.

2. Description of the Prior Art

Multiple unit filtration plants have been in use for some time and consist of a series of filter bowls connected to a water inlet header with filter elements mounted in the bowls, the interior of the filter elements being connected to a clean water outlet header. Valves are provided in all of these connections so that each unit can individually be closed out of the system. The filter bowl is also valve connected to a drain and this permits reversal of the flow through the filter for the purpose of backwashing.

These multiple filters were originally designed for use in soft drink manufacturing and bottling plants. They proved superior to rapid sand filtration in many respects, not only because of their greatly reduced bulk, but also in the quality of water produced, and the exclusive backwash arrangement, producing their own clean water to backwash each filtration unit individually. The assurance of continuous service flow, even when the individual filter units were serviced or backwashed, has become an outstanding feature of these filters. Another important feature of these filters is that only a very small amount of water is required to backwash each unit.

SUMMARY OF THE INVENTION

I have now discovered that this backwashing action can be still further improved with even smaller amounts of backwash water being required by providing a perforated distributor tube within the filter element. This perforated distributor tube preferably extends substantially along the entire length of the filter element and preferably has a multiplicity of uniformly spaced holes in its cylindrical wall. The tube is closed at the top and is connected at the bottom thereof to the filtered water header.

Thus, the present invention in its broadest aspects relates to a filter unit comprising a filter bowl having a tubular filter element therein. The interior of the bowl is valve connected to a raw water header for filtering and is separately valve connected to a drain for backwashing, while the filter element is closed at the top and is connected at the bottom to a filtered water header. Within the filter element there is provided a concentric tube with a plurality of perforations along substantially the length thereof. This tube is closed at the top and is connected at the bottom to the filtered water header and is adapted to collect filtered water entering the interior of the filter element during filtration and to uniformly distribute water against the interior of the filter element during backwashing.

DESCRIPTION OF PREFERRED EMBODIMENTS

According to one preferred embodiment, a filtration plant comprises a plurality of such filter units connected in parallel across a raw water header and a filtered water header.

According to another preferred feature, a manifold is provided for each unit. Each manifold has an outer annular neck with an external thread to receive a filter bowl, an inner annular neck with an inner thread to receive a perforated tube, an annular opening between the annular necks connected to the raw water header and drain and an axial opening within the inner neck connected to the filtered water header. Each filter element preferably rests on an inner neck and is firmly held in place by means of a locking screw on the top of the perforated tube.

The invention is illustrated by the attached drawings in which.

As can be seen from FIGS. 1–4, each filtration plant includes a support stand consisting of end members 10 and 11, angular base members 12 connecting the end members and channel piece 13 also connecting the end members and serving as a support for the individual filtration units.

Figure 1:
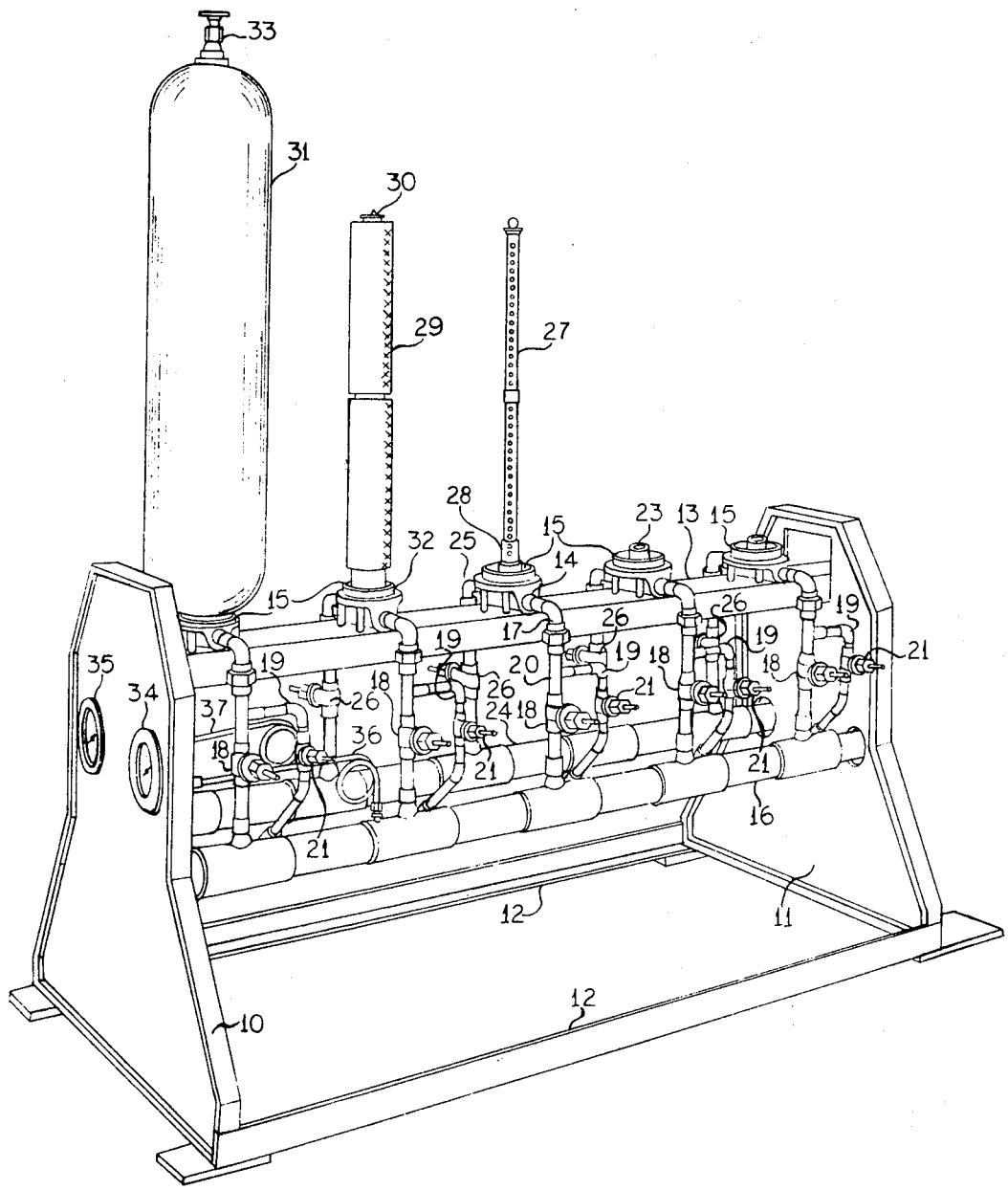
FIG. 1 is a perspective view showing the filtration unit in different stages of assembly.
Figure 2:
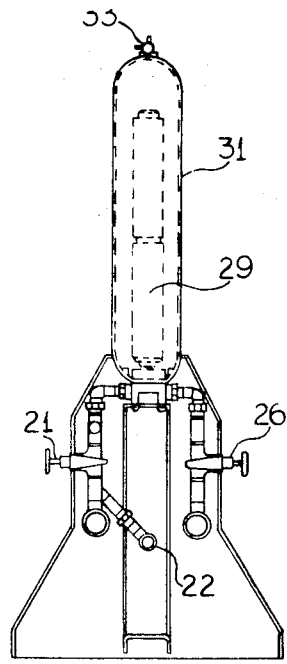
FIG. 2 is a transverse sectional view of one of the units.
Figure 3:
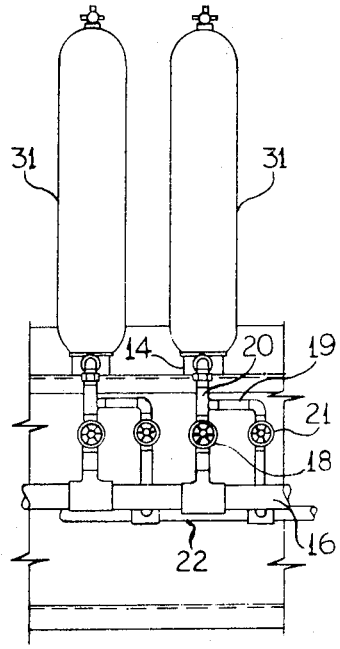
FIG. 3 is an elevation of the lefthand side of FIG. 2.
Figure 4:
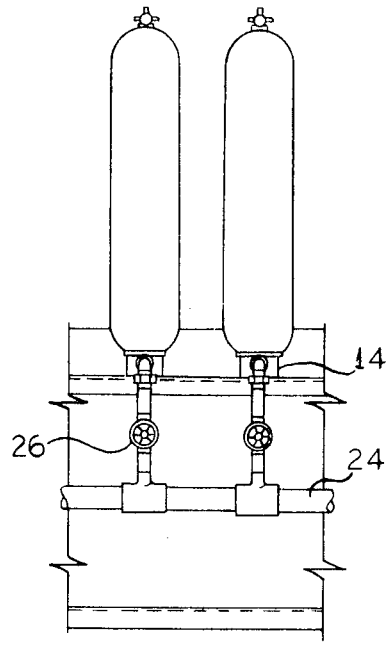
FIG. 4 is an elevation of the righthand side of FIG. 2.

Each filtration unit includes a manifold 14 which is mounted on channel member 13 by means of screws threaded into the bosses 14a. Each manifold 14 has an annular opening 15 which is operatively connected to raw water header 16 by means of pipe 17 and valve 18. A branch line 19 is also connected to line 17 by means of T-connection 20 and line 19 also includes a valve 21. This branch line 19 connects to a drain line 22 (FIG. 2).

An axial opening 23 is also provided in each manifold 14 and this axial opening is operatively connected to filtered water header 24 via line 25 and valve 26. A perforated distributor tube 27 is mounted in the opening 23 via threaded coupling 28.

A one or two part tubular filter element 29 is mounted over tube 27 and is fixed in position by means of locking screw 30.

Finally, filter bowl 31 is mounted on the manifold 14 by means of the screw connection 32. The filter bowl 31 is provided with an air cock 33.

Also mounted on end 10 are an inlet pressure gauge 34 and an outlet pressure gauge 35. These are connected to headers 16 and 24 by means of lines 36 and 37 respectively and indicate the pressure drop across the filter plant.

Figure 5:
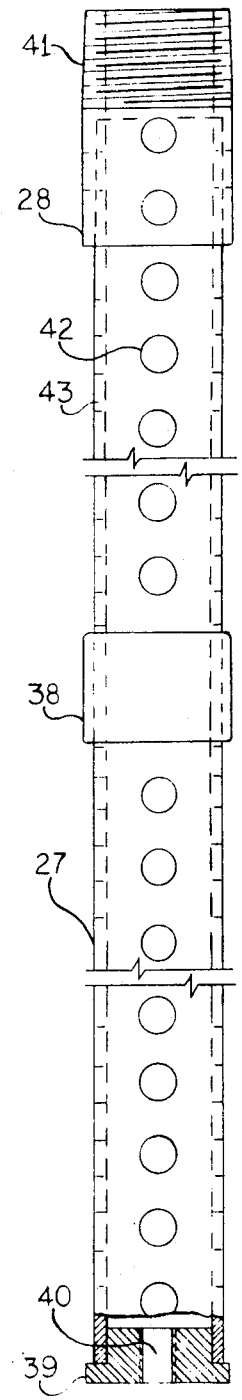
FIG. 5 is a view of the perforated distributor tube.
Figure 6:
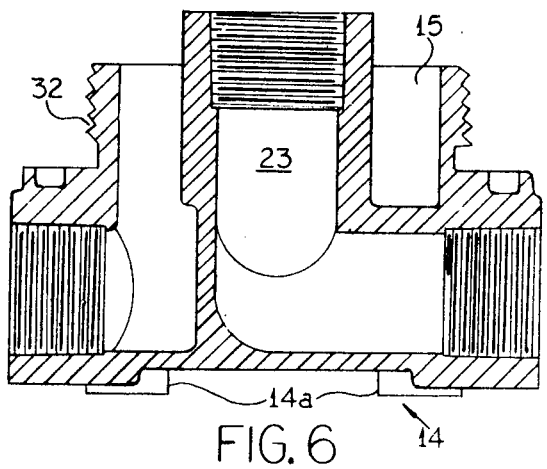
FIG. 6 is a detail sectional view of a manifold.

The perforated distributor tube is shown in greater detail in FIG. 5. The tube 27 is a standard rigid copper or any other convenient material tube and is shown as having a central collar 38 which is used when two-part tubular elements are used. This collar 38 is not required when one long tubular filter element is used. The top end of tube 27 is closed by fitting 39 having a threaded opening 40. This threaded opening 40 receives the screw 30 for holding the filter tube 29 in position.

The lower end of tube 27 has a coupling 28 or any other form of connector is provided with a thread 41 which screws into threaded opening 23.

A series of small holes 42 are drilled in the tube in diametrically opposite positions. A second series of diametrically opposite holes 43 are also drilled in staggered relationship to the series of holes 42. This multiplicity of small holes emanating from the tube in four directions provides a very uniform distribution of backwash water on the filter element during backwashing.

During operation, raw water is distributed from inlet header 16 to the individual units by way of lines 17. The raw water passes from the outer surface of filter tube 29 through the tube into distributor tube 27 and into the axial opening 23 of the manifold 14 and thence to the outlet header 24 by way of line 25.

The raw water flowing through the filter tubes deposits sediment on the outside surface of the filters. The buildup of this sediment cake will gradually impair the flow of water, resulting in the increase of pressure differential between the inlet and outlet lines. This is clearly indicated by gauges 34 and 35.

After a period of time depending entirely on the amount of sediment carried by the raw water and on the usage of the filtered water, the outlet pressure will reach a critical low point. At this stage the plant must be backwashed.

The backwash of each filter element is achieved by reversing the flow of the water through it. To do this the inlet valve 18 of an individual filter unit is closed and the backwash valve 21 is opened. The outlet valve 26 remains open and the filtered water from the outlet header 24 flows through the opening 23 of the manifold 14 and upwards in the distributor tube 27 and out through the holes 42 and 43 therein and out through the filter element 29, dislodging the sediment cake from the whole of the outside surface of each filter element and carrying it to the drain 22.

The individual filter units can be backwashed one after the other in the above manner and it will be seen that each unit can be backwashed without interruption of the operation of the other units, thus providing a continuous flow of filtered water from the plant.

When an individual unit must be opened for inspection or maintenance, valves 18 and 26 are both closed and drain valve 21 and air cock 33 are opened, allowing the contents of the bowl 31 to be washed out to the drain. The individual unit can then be dismantled and serviced as required without interruption to the remaining units in the plant.

Figure 7:
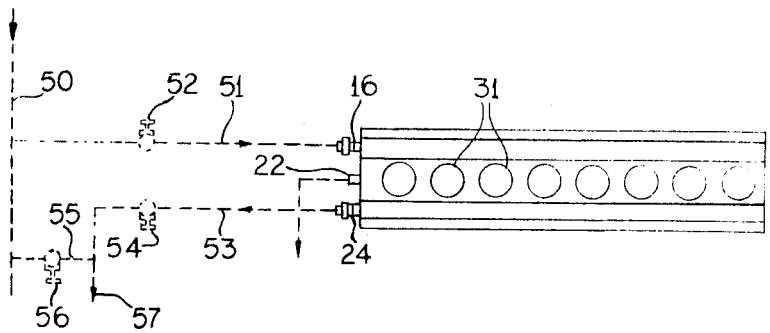
FIG. 7 is a schematic plan view showing a piping arrangement for a single plant.

FIG. 7 shows a simple piping layout for a single filtration plant. A raw water inlet line 50 is connected to inlet header 16 via line 51 and valve 52. The outlet header 24 is connected to a filtered water service line 57 via line 53 and valve 54. A connecting line 55 and valve 56 are also provided between raw water line 50 and filtered water service line 57. During normal filtering operation valves 52 and 54 will normally be open while valve 56 is closed.

Figure 8:
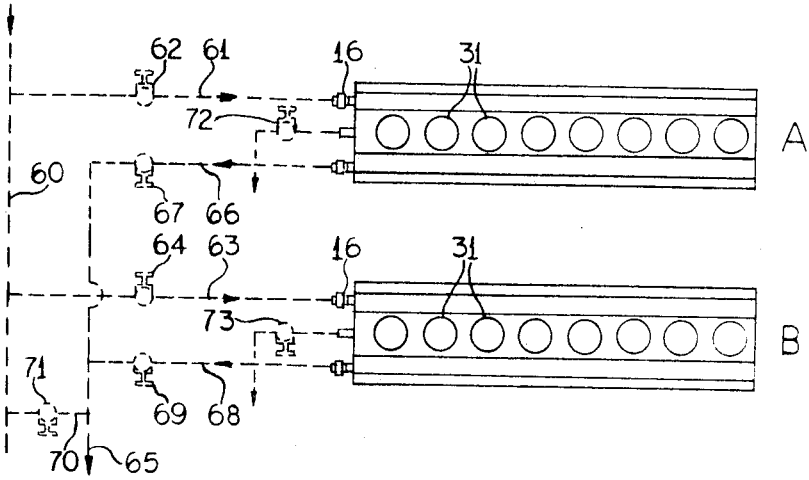
FIG. 8 is a schematic plan view showing a piping arrangement for two plants.

FIG. 8 shows a typical piping layout for a pair or multiple filtration plants. The units are placed in parallel and are connected to raw water distributor line 60 by means of lines 61 and 63 and valves 62 and 64 respectively. The outlet header 24 of plant A is connected to filtered water service line 65 via line 66 and valve 67, while the outlet header of plant B is connected to filtered water service line 65 by way of line 68 and valve 69. A connecting line 70 and valve 71 are provided between raw water line 60 and filtered water service line 65.

During normal filtering service, valves 62, 64, 67, and 69 are all open while valves 71, 72, and 73 are closed. Any individual unit of each plant can be backwashed as described above, but with two plants in parallel it is possible to backwash an entire filtration plant at the same time. For instance, if it is desired to backwash plant A, valve 62 is closed and drain valve 72 is opened. This permits a flow of filtered water from line 65 back through line 66 through plant A and valve 72 into the drain.

A similar procedure can be followed for backwashing the entire plant B while plant A is in service.

Although the above description relates entirely to a manual operation, it will be appreciated that the apparatus can easily be modified to operate on either a semi-automatic or fully automatic basis. Thus, for automatic operation the manual valves can be replaced by solenoid or any other convenient valves connected to suitable timing apparatus, whereby the backwash can be cycled to clean individual units in sequence or to clean groups of filters in sequence.

I claim:

1. A filtration plant comprising a plurality of modular interchangeable filter units connected in parallel across a raw water header and a filtered water header, each filter unit comprising: a filter bowl having a tubular filter element therein, a manifold connected to the filter bowl and filter element, said manifold provided with an inner central opening connected to the inside of the tubular element and an annular opening connected to the outer portion of the bowl outside of the tubular element, a first fluid line having a valve therein and connecting the outer annular manifold opening, and hence the said outer portion of the bowl outside of the tubular element to the raw water header for receiving raw water to be filtered, a second fluid line with a second fluid valve therein connecting the said outer portion of the bowl via the first line to a drain for backwashing the filter element and a third fluid line with a third valve therein connecting the central opening of the manifold, and hence the inside of the tubular element to the filtered water header, each filter unit constructed and arranged so that filtered water entering the interior of the filter element during filtration is collected and during backwashing water is uniformly distributed against the interior of the filter element.

2. A filtration plant according to claim 1 wherein each said manifold has an outer annular neck with an external thread to receive said filter bowl, an inner annular neck with an inner thread to receive said filter element, said annular opening being located between the annular necks connected to the raw water header and drain and said inner central opening being an axial opening within the inner neck connected to the filtered water header.

3. A filtration plant according to claim 2 wherein each filter element rests on the said inner neck and is firmly held in place by means of a lock nut.

4. A filtration plant, according to claim 1 in in said valves are adapted for remote semi-automatic or automatic control.

5. A multiple filtration plant as set forth in claim 1 including a series of interconnected units each of which has a multiple of individual filter units, the said interconnected units being provided with inlet, outlet and backwash valves, and the said individual filter units being provided with inlet, outlet and backwash valves, all of the said valves being adopted for remote semi-automatic or automatic control.

* * * * *